June 21, 1960    D. D. BEEBE    2,941,627
BOAT TRAILER WINCH
Filed July 3, 1956    2 Sheets-Sheet 1
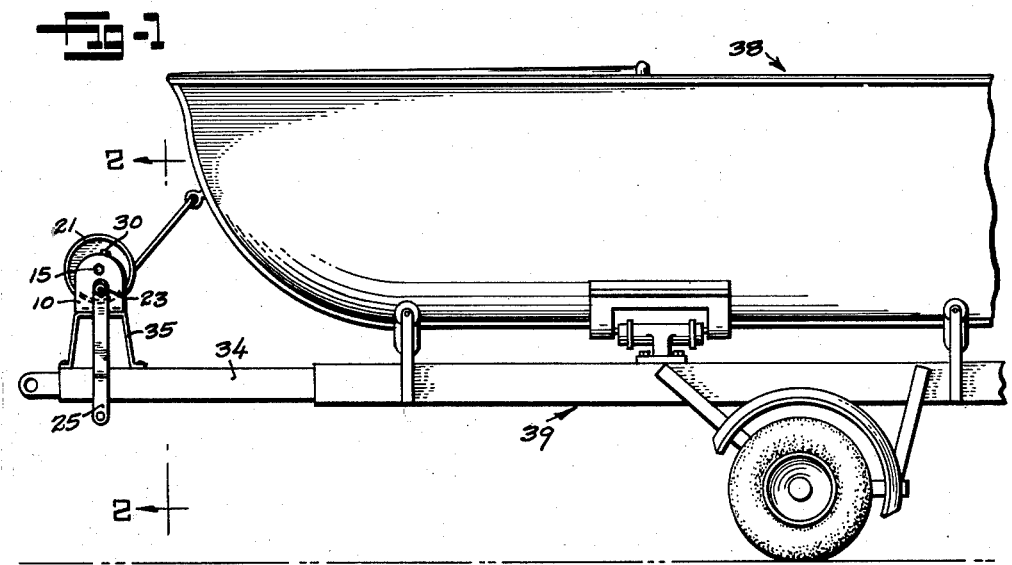
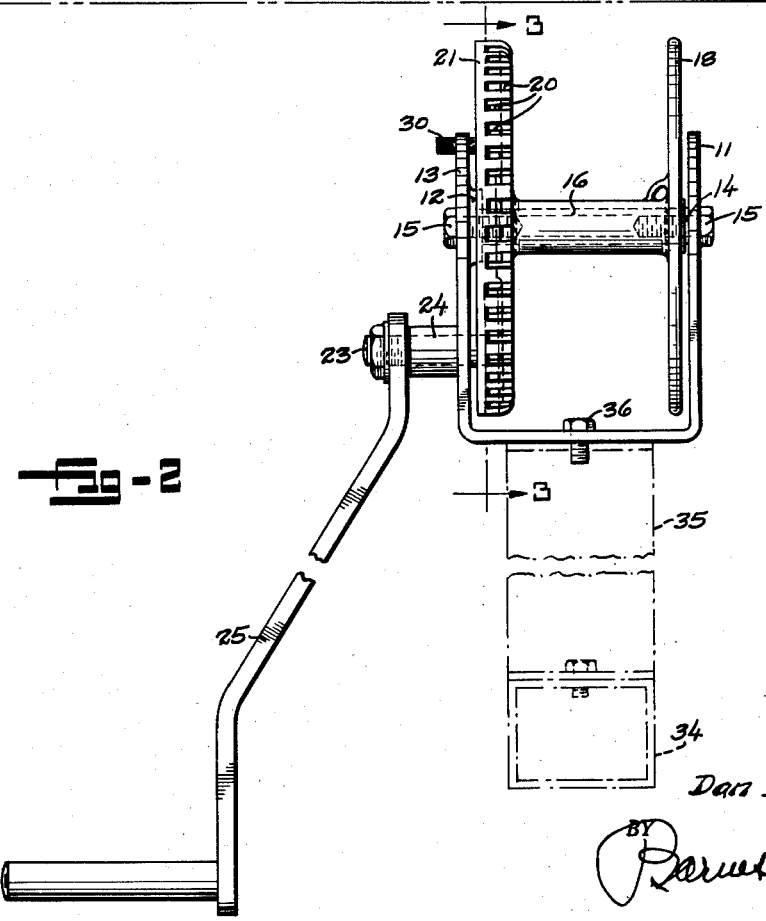
INVENTOR.
Dan D. Beebe
BY
Barnes & Reed
attys.

June 21, 1960 D. D. BEEBE 2,941,627
BOAT TRAILER WINCH
Filed July 3, 1956 2 Sheets-Sheet 2
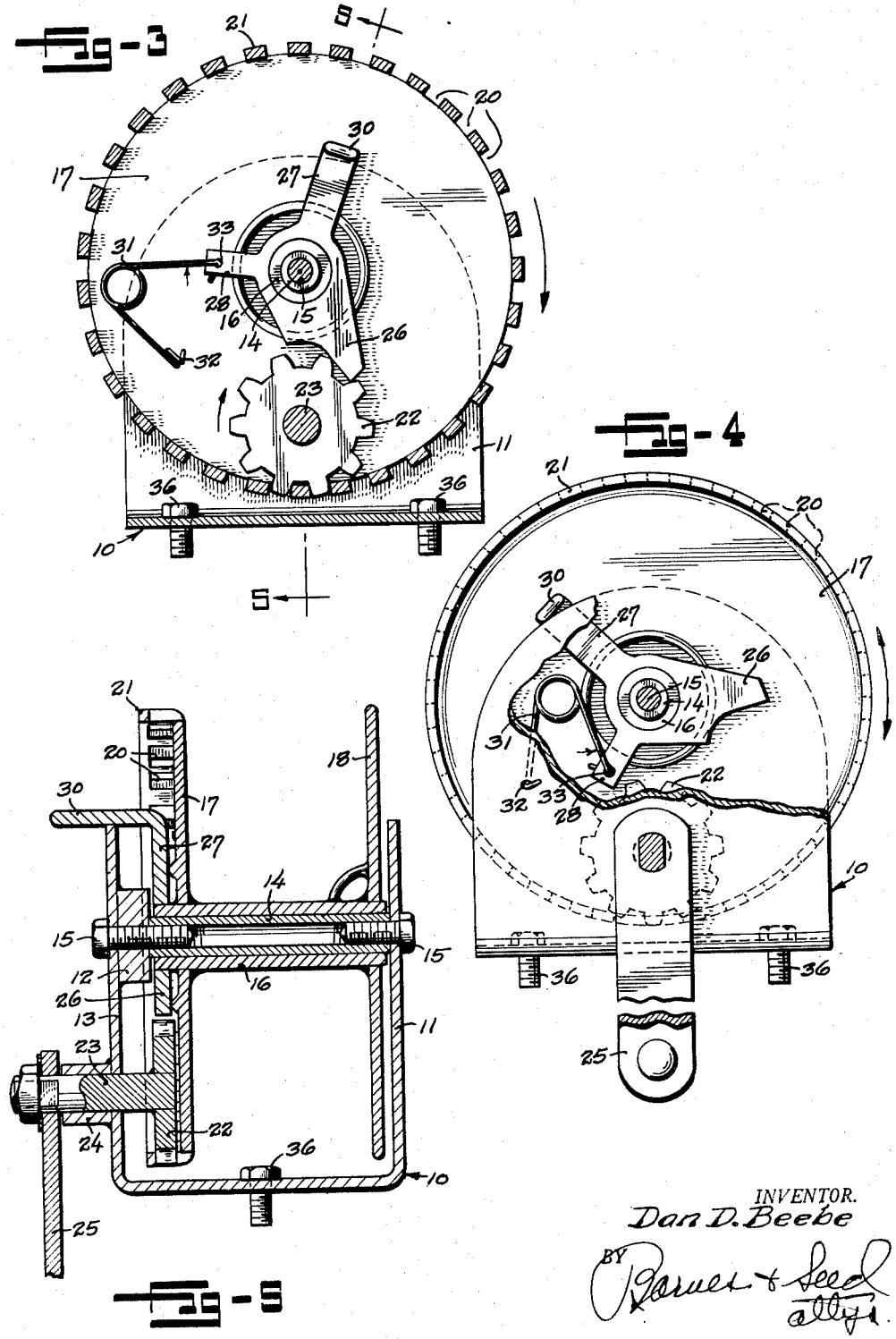
INVENTOR.
Dan D. Beebe

United States Patent Office 2,941,627
Patented June 21, 1960

2,941,627

BOAT TRAILER WINCH

Dan D. Beebe, Seattle, Wash., assignor to Beebe Bros., a partnership

Filed July 3, 1956, Ser. No. 595,761

1 Claim. (Cl. 188—82.7)

This invention relates to a hand-operated boat trailer winch, and namely a winch adapted to be mounted on a boat trailer for use in launching the boat from the trailer and drawing the boat onto the trailer.

Having for its general object the provision of a strong and durable hand-operated winch of light weight and which is of unusually simple and inexpensive construction, the invention consists in a structural assembly whose component parts are drawn from stock materials and which requires only stamping and welding in order to fabricate these stock materials into an operating unit. The invention further consists in the novel construction and in the adaptation and combination of parts hereinafter described and claimed.

In the accompanying drawings:

Figure 1 is a fragmentary side elevational view of a boat trailer with a boat thereon, and having mounted on said trailer a hand-operated winch constructed to embody the preferred teachings of the present invention.

Fig. 2 is a fragmentary and elevational view of the winch, employing an enlarged scale and representing by broken lines a fragmentary showing of the tongue of the trailer and a mounting bracket thereon.

Fig. 3 is a longitudinal vertical sectional view drawn to an enlarged scale on line 3—3 of Fig. 2.

Fig. 4 is a side elevational view of the winch with parts broken away and representing the dogging pawl as having been moved to an inoperative position as distinguished from the engaged position in which it is portrayed in Fig. 3; and Fig. 5 is a transverse vertical sectional view on line 5—5 of Fig. 3.

The winch of the present invention provides a frame 10 having the usual U-shape, and extending across the throat of this frame from one cheek section 11 thereof to a boss 12 provided at the inner side of the other cheek section 13 is a drum shaft 14, such drum shaft being secured in position by cap screws 15.

Journaled upon said shaft is the winding drum presenting a spooling reel with flanges at each end, and it is a particular feature of the invention that such drum is fabricated from stock material connected by welding. Considered in more particularity, the reel, designated by 16, is drawn from tube stock while each of the two flanges 17 and 18 are stamped from single pieces of plate stock, each presenting a central aperture of a size to fit over the tube. Flange 17 lies at that end of the drum proximal to the boss 12 and is spaced inwardly from the extremity of the tube in such a degree that a substantial portion of the latter protrudes as an exposed hub. This flange, in the stamping operation, has formed adjacent its periphery at equidistantly spaced intervals of the circumference a multiplicity of square openings 20, and by bending a rim section 21 of the flange outwardly at right angles to the plane of the flange these square openings form the teeth of a lantern-type spur gear. The pinion complement of this gear wheel is denoted by 22, and is, like the drum flanges, stamped from plate stock. A shaft 23 to which the pinion is welded receives a journal in a boss 24 provided at the outer side of the frame's cheek section 13, and fitted to an exposed end of this pinion shaft is an operating handle 25. As with the parts already described, the frame is fabricated from stock material, comprising a plate bent to a U-shape with the bosses welded thereto.

As a dogging mechanism for the winch I provide a chisel-type pawl 26 extending radially from a plate which is journaled upon said exposed hub of the drum for pivotal movement of the chisel tip into and out of engagement with the pinion 22. Diametrically opposite from the pawl said plate also presents two arms 27 and 28. Arm 27 performs the office of a set lever and upon its outer end presents an out-turned finger 30 shiftable by hand into either of two positions, one being the position indicated in Fig. 3 whereat the dog is in ratcheting engagement with the pinion 22 and the other being the position shown in Fig. 4 whereat the dog is retracted from the pinion with the finger 30 bearing upon the frame. A sear spring 31 yieldingly urges said arm 27 into the positions described, such spring having one of its two ends anchored, as at 32, to the frame with its other end lodging in a hole 33 provided in said arm 28 of the dogging plate. It will be seen that the "throws" of said arm 28 brings the related end of the spring well past center when the pawl moves both into and out of its engaged position, thus tensioning the plate to hold the pawl against the pinion and also to hold the finger 30 in its "stop" position against the frame.

While the winch self-evidently adapts itself to sundry uses, the use for which it is especially designed is illustrated in Fig. 2, and namely as an adjunct to a boat trailer in facilitating the work of loading and unloading the boat. With the boat and the trailer designated by 38 and 39, respectively, it will be seen that I secure upon the tongue 34 of such trailer a mounting bracket 35, and that the winch is bolted, as at 36, to such bracket.

It is thought that the invention and the advantages thereof will have been clearly understood from the foregoing detailed description of the illustrated preferred embodiment. Minor changes will suggest themselves and may be resorted to without departing from the spirit of the invention, wherefor it is my intention that no limitations be implied, and that the hereto annexed claim be given a scope fully commensurate with the broadest interpretation to which the employed language admits.

What I claim is:

In a winch mechanism having a frame, a rotary pinion on the frame and a pawl mechanism mounted alongside the frame for pivotal movement in a coinciding plane so as to be moved into and out of dogging engagement with the pinion, a sear spring having one end anchored to the frame, said pawl being formed from a single piece of plate stock with three arms radiating in a common plane from the pivoted hub and spaced at intervals of the circumference of a circle taken about the pivotal axis as a center, one of said arms serving as the pawl proper, a second said arm as a shifting arm and being operated by hand for moving the pawl into and out of its ratcheting position, the third arm being engaged by the other end of said sear spring, and the second said arm being so formed that the same engages the frame to serve as a stop limiting the travel of the pawl as it moves out of ratcheting position, the placement of the third said arm in relation to the anchored end of the sear spring being such that the arm-engaged end of the sear spring travels through and beyond center in the movement of the pawl to each of its two end limits of travel.

(References on following page)

References Cited in the file of this patent

UNITED STATES PATENTS

| | | |
|---|---|---|
| 159,124 | Tomlinson et al. | Jan. 26, 1875 |
| 594,219 | Tredwell | Nov. 23, 1897 |
| 1,386,400 | Gettle et al. | Aug. 2, 1921 |
| 2,157,776 | Steinkamp | May 9, 1939 |
| 2,738,954 | Du Bois | Mar. 20, 1956 |
| 2,747,838 | Riemann | May 29, 1956 |
| 2,750,150 | Lucker | June 12, 1956 |

OTHER REFERENCES

"Product Engineering," May 1953 (pages 208, 209 relied on). Copy in Scientific Library and in Div. 12 of the U.S. Patent Office.